United States Patent
Arai et al.

(12) 
(10) Patent No.: US 6,275,338 B1
(45) Date of Patent: *Aug. 14, 2001

(54) LIGHT REGULATION DEVICE

(75) Inventors: Takayuki Arai, Kasukabe; Kayoko Watai, Hasuda, both of (JP)

(73) Assignee: Enplas Corporation, Kawaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,623

(22) Filed: May 27, 1997

Related U.S. Application Data

(63) Continuation of application No. 08/412,140, filed on Mar. 28, 1995, now abandoned.

(30) Foreign Application Priority Data

Mar. 29, 1994 (JP) .................................................. 6-083983

(51) Int. Cl.$^7$ .................................. G02B 5/02; F21V 8/00
(52) U.S. Cl. .......................... 359/599; 359/707; 359/831; 349/65; 362/31
(58) Field of Search ........................... 359/599, 613–615, 359/619, 707; 362/29–31, 26, 328–337; 349/57, 62–65

(56) References Cited

U.S. PATENT DOCUMENTS

| | | | | |
|---|---|---|---|---|
| 4,114,983 | * | 9/1978 | Maffitt et al. ........................ | 359/599 |
| 4,257,084 | * | 3/1981 | Reynolds ............................... | 362/31 |
| 4,648,690 | * | 3/1987 | Ohe ........................................ | 362/31 |
| 4,729,068 | * | 3/1988 | Ohe ........................................ | 362/31 |
| 4,811,507 | * | 3/1989 | Blanchet ............................... | 362/31 |
| 4,989,933 | * | 2/1991 | Duguay ................................. | 359/599 |
| 5,013,141 | * | 5/1991 | Sakata ................................... | 359/569 |
| 5,384,658 | * | 1/1995 | Ohtake et al. ........................ | 359/599 |
| 5,467,208 | * | 11/1995 | Kokawa et al. ...................... | 362/31 |
| 5,471,348 | * | 11/1995 | Miller et al. .......................... | 359/837 |
| 5,584,556 | * | 12/1996 | Yokoyama et al. .................. | 362/31 |
| 5,887,964 | * | 3/1999 | Higuchi et al. ....................... | 349/65 |
| 5,899,552 | * | 5/1999 | Yakoyama et al. .................. | 349/62 |

FOREIGN PATENT DOCUMENTS

| | | | | |
|---|---|---|---|---|
| 252933 | * | 10/1989 | (JP) ...................................... | 359/599 |
| 173134 | * | 7/1993 | (JP) ...................................... | 359/599 |
| 6-18707 | * | 1/1994 | (JP) ...................................... | 359/599 |
| 59108 | * | 3/1994 | (JP) ...................................... | 359/599 |
| 82634 | * | 3/1994 | (JP) ...................................... | 359/599 |

OTHER PUBLICATIONS

"Backlighting for liquid crystal display", IBM Technical Disclosure Bulletin, vol. 29, No. 11, Apr. 1987, pp 4838–4839.*

* cited by examiner

*Primary Examiner*—Thong Nguyen
(74) *Attorney, Agent, or Firm*—Staas & Halsey LLP

(57) ABSTRACT

A light regulation element regulates both the travelling direction and diffusion state of a light emitted from a surface light source device. Lights from a cylindrical light source 2 such as a cold cathode tube is introduced in a light guide 1. The light guide 1 has an emission surface 1*a* on the side opposite to a reflection element 4, and a light regulation element 3 is arranged in opposition to the emission surface 1*a*. Protrusions 3*a* are formed on one surface or both surfaces of the light regulation element 3. Coated on the surface on the light emission side of the light regulation element 3 is a light diffusion layer 5. The turbidity of the light diffusion layer 5 falls within a range from 1900 cm$^{-1}$ to 2400 cm$^{-1}$. The light emitted from the emission surface 1*a* of the light guide penetrates the light regulation element 3, thereby causing the light travelling direction to be regulated. Then, the light whose travelling direction has been regulated penetrates the light diffusion layer 5, thereby causing a light diffusion. The light diffusion layer 5 is formed, for example, by mixing fine particles of a glass having a light penetrability or of a synthetic resin such as acryl and silicone, or fine hollow particles of glass, acryl resin or the like, or air bubbles in a coating material having a light penetrability.

2 Claims, 6 Drawing Sheets

LIGHT REGULATION DEVICE

This application is a continuation of application Ser. No. 08/412,140, filed Mar. 28, 1995, now abandoned.

BACKGROUND OF THE INVENTION

1. Technical Field

The present invention relates to a light regulation device for regulating the travelling direction of light. and more particularly to a light regulation element for regulating the travelling direction of the light emitted from a surface light source device.

2. Description of Related Art

Where a surface light source device is applied to the backlight of a liquid crystal display, a range in which the display contents of the liquid crystal display can be clearly and visually recognized, that is, a view angle, and a brightness observed when the display screen is watched are affected by the travelling direction and spread of the light emitted from the surface light source device.

The more diffused the light emitted from the surface light source device, the wider the view angle becomes, but the darker the display becomes.

On the contrary, the less diffused the emitted light, the narrower the range of view angle becomes, but the larger the quantity of the light travelling in a specific direction becomes. When the display is watched in a direction corresponding to the light travelling direction, the display is observed to be bright.

On the contrary, when the direction in which the display is watched is largely deviated from the light travelling direction, the contrast of the display is lowered to cause the display contents not to be visually recognized.

Thus, where a surface light source device is applied to the backlight of a liquid crystal display, it has been necessary to change the diffusion state and travelling direction of the light emitted from the surface light source device in such a manner that the view angle and the display required for the liquid crystal display are adapted to the watching direction.

Also, where a surface light source device is used for a local illumination for illuminating a specific area, the more diffused the light, the wider area the device can illuminate, but the lower the illuminance becomes. On the contrary, the less diffused the light, the narrow area the device illuminates, but the higher the illuminance becomes.

Of course, also for the local illumination, the regulation of the light travelling direction is important, so that the light is required not to proceed in an undesirable direction.

According a conventional a method of changing the diffusion state and travelling direction of the light emitted from a surface light source device, both a diffusion element are arranged and a light regulation element are arranged on the emission surface of a surface light source device.

FIG. 5 illustrates an example of the configuration of a conventional surface light source device. Referring to FIG. 5, a cylindrical light source 2 is arranged along an incident surface 1b of a light guide 1. Arranged on an emission surface 1a of the light guide 1 are a light regulation element 3 and a diffusion element 6 in a state in which they are overlapped in a manner not to completely contact to each other. Arranged on the surface on the side opposite to the emission surface 1a of the light guide 1 is a reflection element 4.

The light emitted from the light source 2 enters the light guide 1 from the incident surface 1b of the light guide, and part of the light while travelling in the light guide 1 is emitted directly from the emission surface 1a. And another part of the light is reflected by a rough surface (not shown), or an ink print portion or the like formed on the light guide 1, and emitted form the emission surface 1a.

The light emitted from the emission surface 1a penetrates the light regulation element 3. The light travelling direction is bent by the action of many protrusions 3a provided on one surface of the light regulation element 3, whereby the light travelling direction is regulated in a desirable direction. Then, the light penetrates both a very narrow gap 10 (shown exaggeratedly in FIG. 5 ) formed between the light regulation element 3 and the diffusion element 6 and then the diffusion element 6, whereby the diffusion state of the light can be changed to a desired one.

However, for the surface light source device shown in FIG. 5, it is necessary to arrange both the light regulation element 3 and the diffusion element 6 on the emission surface 1a of the light guide.

If foreign matters such as dirt and dust adhere onto optical parts, or a flaw occurs thereon, the performance thereof will be remarkably deteriorated. Particularly for a surface light source device as shown in FIG. 5, there has frequently occurred a problem in that foreign matters are caught between the light regulation element 3 and the diffusion element 6 in the manufacturing process thereof.

Also where the surface light source device is assembled, individual parts must be checked to make sure there is no flaw or dirt, and then assembled with meticulous care. As a result, an increase by only one in the number of parts causes the manufacturing cost to be significantly increased.

Further, means for fixing both the light regulation element 3 and the diffusion element 6 are necessary, so that the size of the surface light source device tends to be large.

Further, a fact that the gap 10 consisting of an air layer exists between the light regulation element 3 and the diffusion element 6 generally means that, a layer having a refractive index much smaller relatively exists between the light regulation element 3 and the diffusion element 6. Therefore, although the gap 10 has an effect of diffusing the light, the gap 10 also causes the light utilization efficiency to be decreased due to the reflection on the interface with both the elements 3 and 6.

OBJECT AND SUMMARY OF THE INVENTION

An object of the present invention is to provide a light regulation element which is easily manufactured. And, another object of the present invention is to provide a light regulation element which, while regulating the travelling direction of a light emitted from a surface light source device, can convert the light to a diffused light which can satisfy a view angle required for the liquid crystal display. A still another object of the present invention is to provide a light regulation device which can be also applied to a surface light source device for local illumination.

In order to achieve these objects, there is provided a light-penetrable light regulation element having at least one light regulation surface. The shape of the light regulation surface of the light regulation element includes a plurality of concave and convex shape segments (protrusions) for bending the travelling direction of the light penetrating the light regulation element. And, at least either of the light regulation surface or the surface on the side opposite to the light regulation surface is covered with a light diffusion layer, and it is desirable that the turbidity of the layer falls within a range from 1900 $cm^{-1}$ to 2400 $cm^{-1}$. The light diffusion layer may include a portion in which the air exists.

Generally, the regulating of the light travelling direction and the allowing of the light to be diffused are opposed to each other. A fact that the light becomes diffused means that the light travelling direction is disturbed, and the regulating of the light travelling direction means the regulating of the light diffusion.

Therefore, it is necessary to set the light diffusion ability of the light diffusion layer provided on the light regulation element so as to obtain a desirable balance with the ability to regulate the light travelling direction.

BRIEF DESCRIPTION OF THE DRAWINGS

FIG. 4 is an illustration to help explain a method of measuring the turbidity of an optical part in which a coating of a light diffusion layer is provided on a transparent substrate.

DETAIL DESCRIPTION OF PREFERRED EMBODIMENT

As a method of evaluating the ability of the light diffusion layer coated on the light regulation element, the turbidity described below can be used. With reference to FIG. 4, a method of measuring the turbidity will be explained.

Figure 4A:
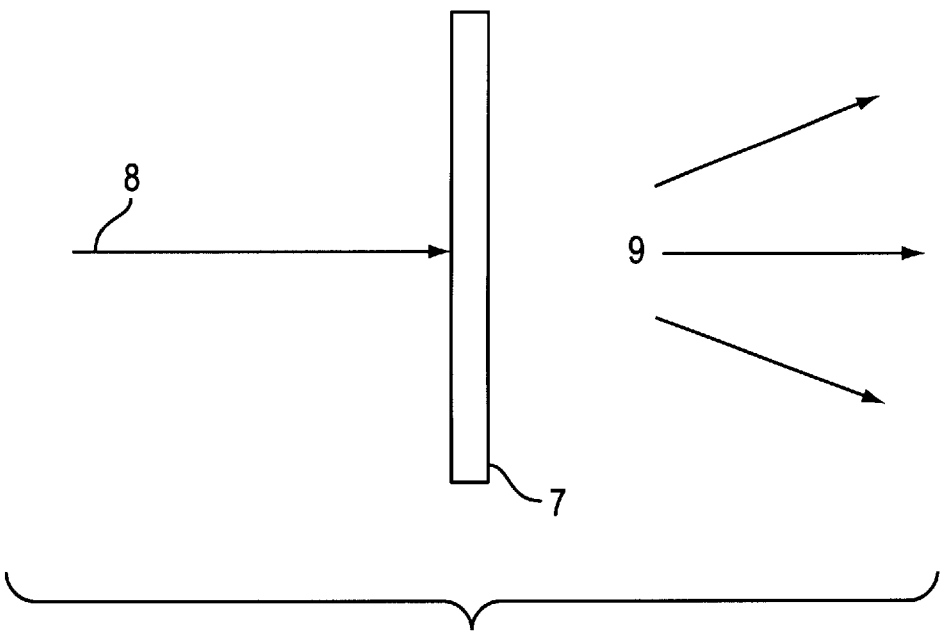
FIG. 4(a) shows a method of determining an $I_0$.

First, as shown in FIG. 4(a), a He—Ne laser beam 8 is irradiated vertically onto a transparent substrate 7 and the intensity of the light 9, a part of the light penetrating the transparent substrate 7, which penetrates in a direction perpendicular to the transparent substrate 7 is measured. The value thus obtained is taken as $I_0$.

Figure 4B:
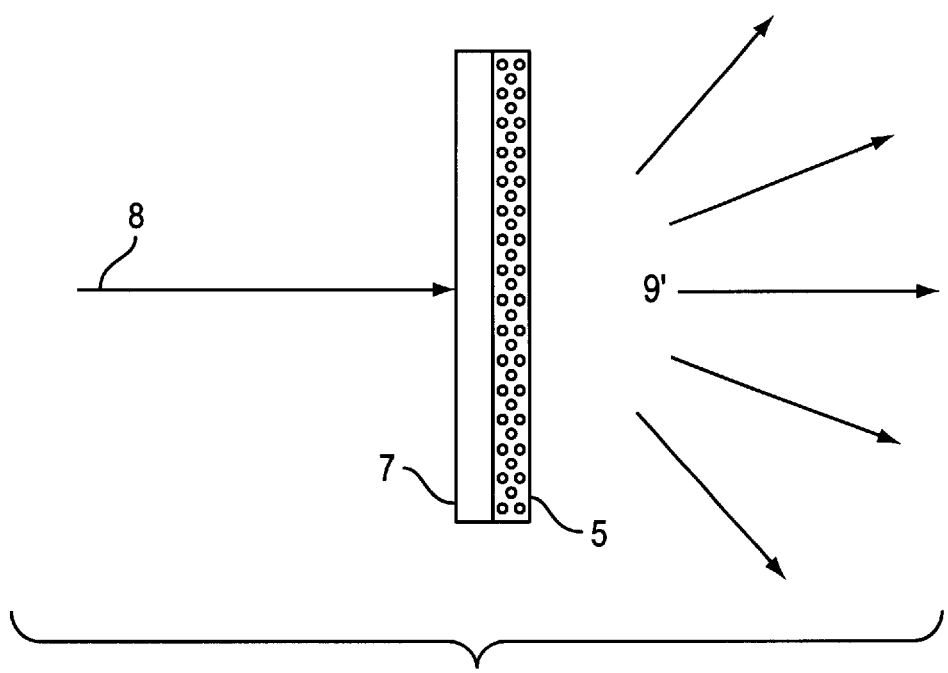
FIG. 4(b) shows a method of determining an I.

Then, as shown in FIG. 4(b), with the light diffusion layer 5 having thickness of d cm coated on the transparent substrate 7, the He—Ne laser beam 8 is irradiated vertically onto the transparent substrate 7 in the same manner as in FIG. 4(a), and the light intensity of light 9', a part of the light penetrating the transparent substrate 7 and light diffusion layer 8, which penetrates in a direction perpendicular to the transparent substrate 7 is measured. The value thus obtained is taken as I.

The above-mentioned values I, $I_0$ and d are substituted in the following equation;

$$E\ cm^{-1} = -(1/d)\ \ln(I/I_0)$$

The value of the E thus obtained is taken as the turbidity. The value can be used to evaluate the light diffusion layer coated on the transparent substrate. The larger the value of the turbidity, the stronger the light diffusion effect becomes, while the smaller the value of the turbidity, the weaker the light diffusion effect becomes.

Therefore, if the value of the turbidity of the light diffusion layer provided on the light regulation element is excessively large, the light regulation ability which the light regulation element has will be deteriorated. On the contrary, if the value of the turbidity is too small, the effect of diffusing the light will become weak. Where the light regulation element of the present invention is applied to an ordinary surface light source device, for the turbidity of the light diffusion layer lower than 1900 $cm^{-1}$, the action to diffuse the light is too weak. For example, when the element is used as the backlight of a liquid crystal display, usually, the view angle required generally for the liquid crustal display is not realized sufficiently and becomes narrow.

On the contrary, if a light diffusion layer whose turbidity exceeds 2400 $cm^{-1}$ is provided on the light regulation element, the light regulation effect will be cancelled. As a result, when the element is applied to the backlight of a liquid crystal display, the quantity of the light oriented to outside the range of a view angle required is increased, causing a problem with respect to light utilization efficiency.

For that reason, where the element is used in the surface light source device as the backlight of a liquid crystal display, a suitable range of the turbidity of the light diffusion layer is from 1900 $cm^{-1}$ to 2400 $cm^{-1}$. It is also preferable that the range of the turbidity of the light diffusion layer (1900 $cm^{-1}$ to 2400 $cm^{-1}$) is applied to most of local illuminations usually used.

Figure 1:
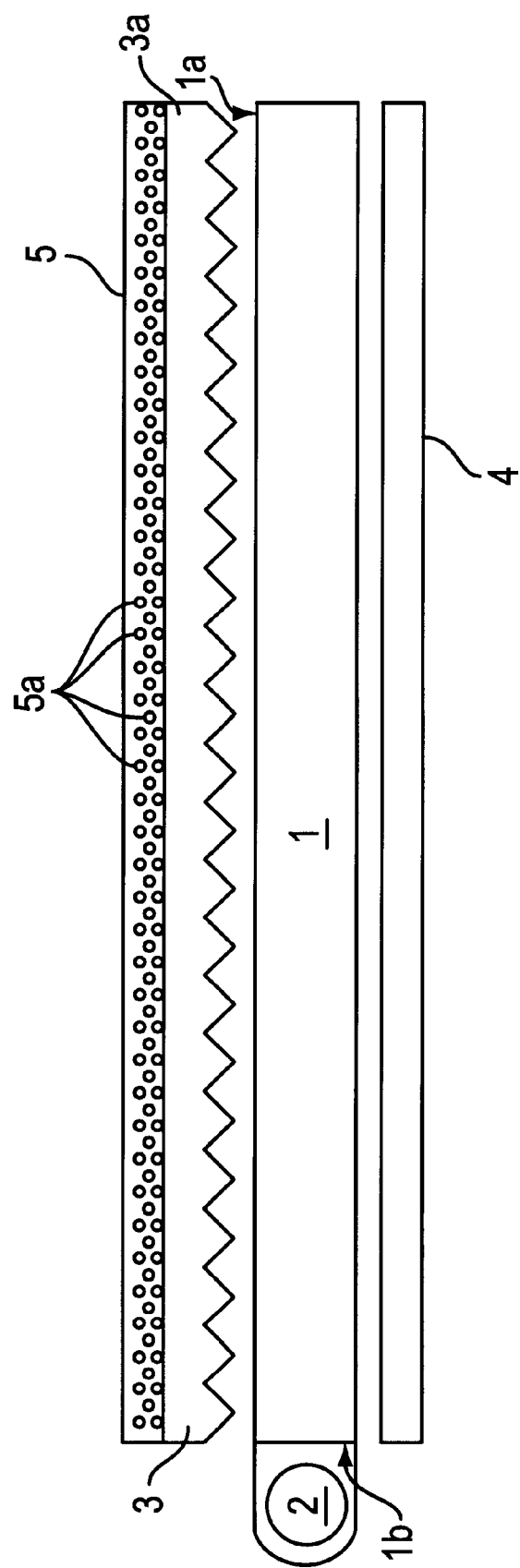
FIG. 1 illustrates an example of the configuration of a surface light source device employing a light

FIG. 1 shows an example of a state in which a light regulation element of the present invention is arranged practically for a surface light source device. Reference code 1 indicates a light guide, and reference code 2 indicates a cylindrical light source such as a cold cathode tube. A light regulation element indicated by 3 has a light regulation surface, on which protrusions 3a having regularly the same shape are formed. Reference code 4 indicates a reflection element, and reference code 5 indicates a light diffusion layer coated on the surface on the side opposite to the surface on which the protrusions 3a are formed. The turbidity of the light diffusion layer 5 is within a range from 1900 $cm^{-1}$ to 2400 $cm^{-1}$.

Figure 5:
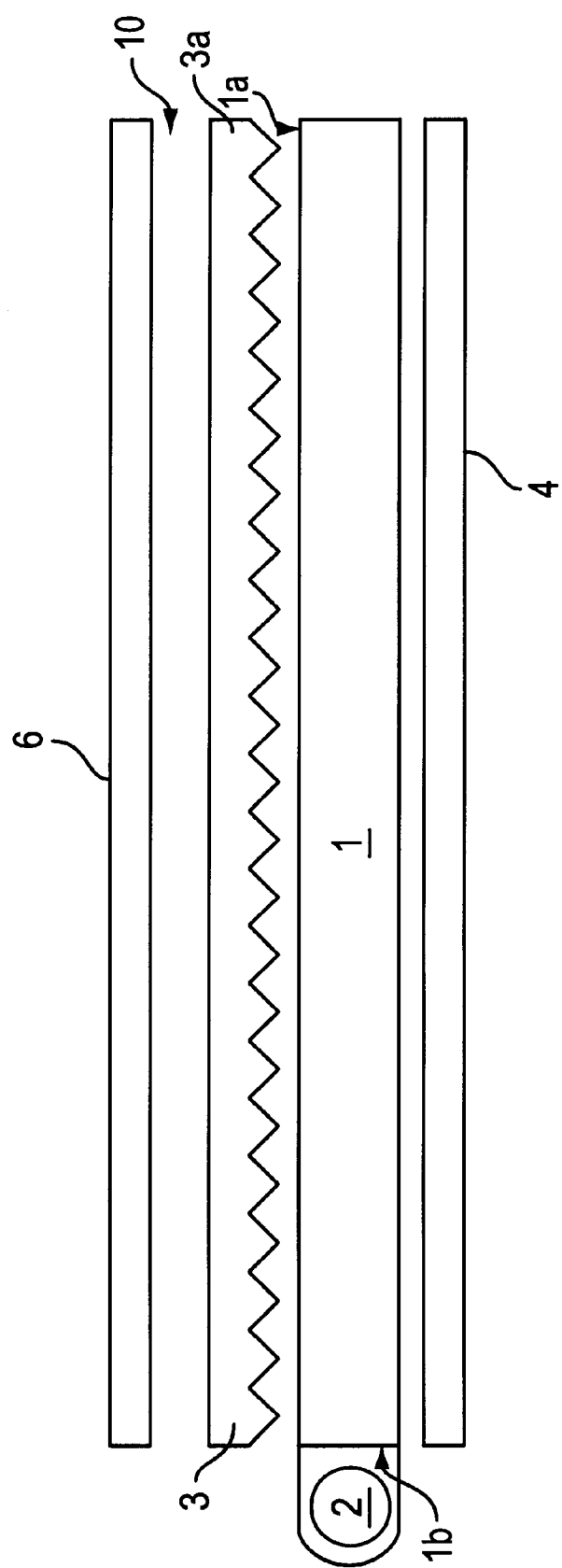
FIG. 5 illustrates an example of the configuration of a conventional surface light source device.

The light diffusion layer 5 functions the same action as a light diffusion element 6 shown in FIG. 5. After a light emitted from the light source 2 and introduced into the light guide 1 is emitted from an emission surface 1a, first the light penetrates the light regulation element 3, thereby causing the light travelling direction to be regulated. Then, the light whose travelling direction has been regulated penetrates the light diffusion layer 5, thereby causing a light diffusion.

The light diffusion layer 5 is formed, for example, by mixing fine particles 5a of a glass having a light penetrability or of a synthetic resin such as acryl and silicone, or fine hollow particles 5a of glass, acryl resin or the like, or air bubbles 5a in a coating material having a light penetrability. Fine particles having various shapes such as spherical shape, rectangular shape and bar shape may be used. Generally, if the light diffusion ability of a light diffusion layer is high, the thickness of the light diffusion layer may be thin.

Generally, the air may often be much lower in refractive index than a coating material having a light penetrability, so that mixing the above-mentioned fine hollow particles or air bubbles 5a in the coating material having a light penetrability allows a high light diffusion effect to be obtained even when the light diffusion layer 5 is similarly thin.

With consideration to the easiness of manufacture, the size of the hollow part of the fine hollow particles or of air bubbles 5a, taking spherical shape for example, falls preferably within a range from about 0.1 $\mu m$ to 10 $\mu m$ in diameter.

Figure 2:
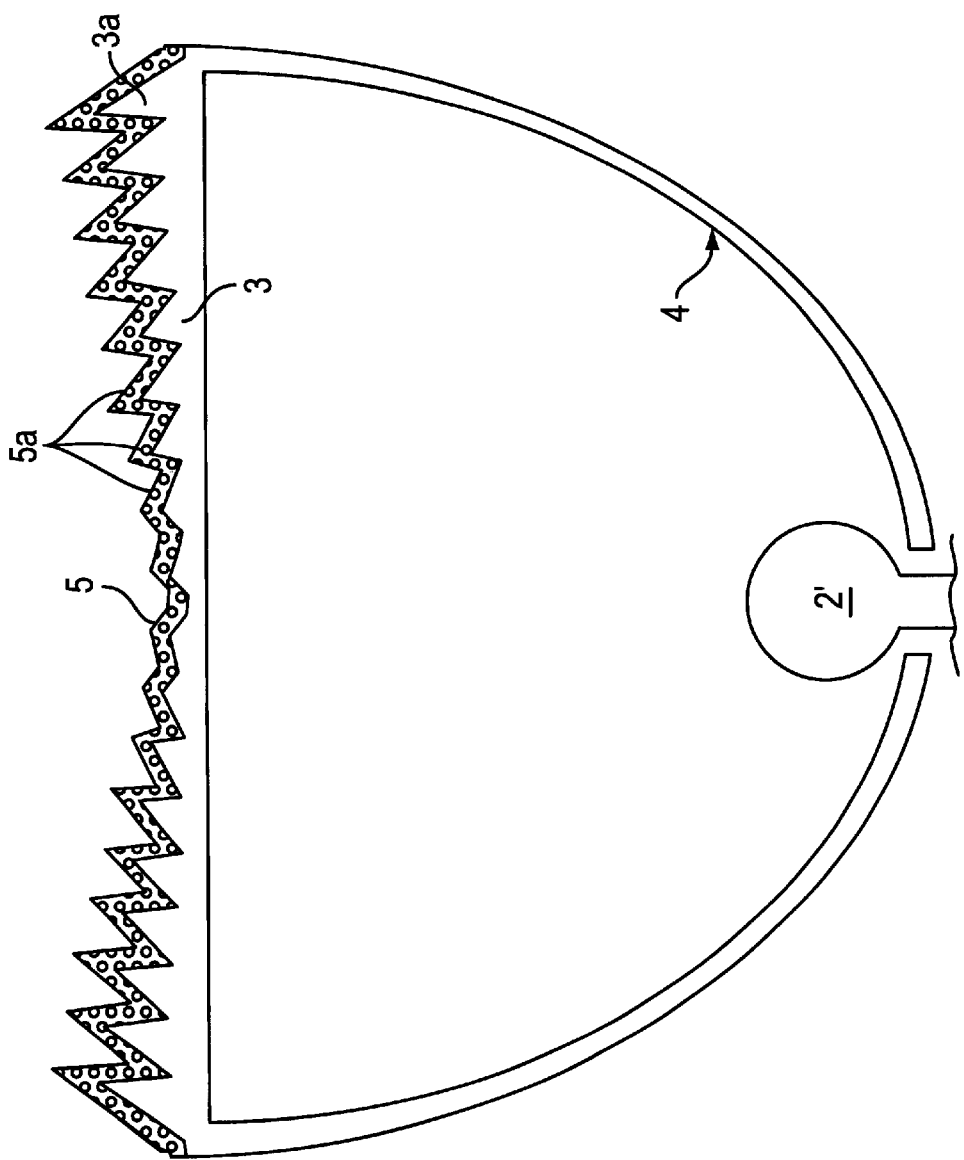
FIG. 2 illustrates an example of the configuration of a surface light source device different from that shown in FIG. 1, where the surface light source device employs a light regulation element of the present invention.

FIG. 2 illustrates a surface light source device employing the light regulation element 3 in which the shape of protrusions 3a on the central portion is different from that on the peripheral portion. As clearly shown in FIG. 2, each of the protrusions has a depth, the depth of the protrusions being greater toward the peripheral portions of the light regulation element then at the central portion of the light regulation element. Referring to FIG. 2, a substantially spherical-shape light source 2' such as an electrical lamp is arranged in a curved the light regulation element 3 shown in FIG. 3, a light with a different diffusion state in a lateral direction and longitudinal direction can be produced.

Figure 3:
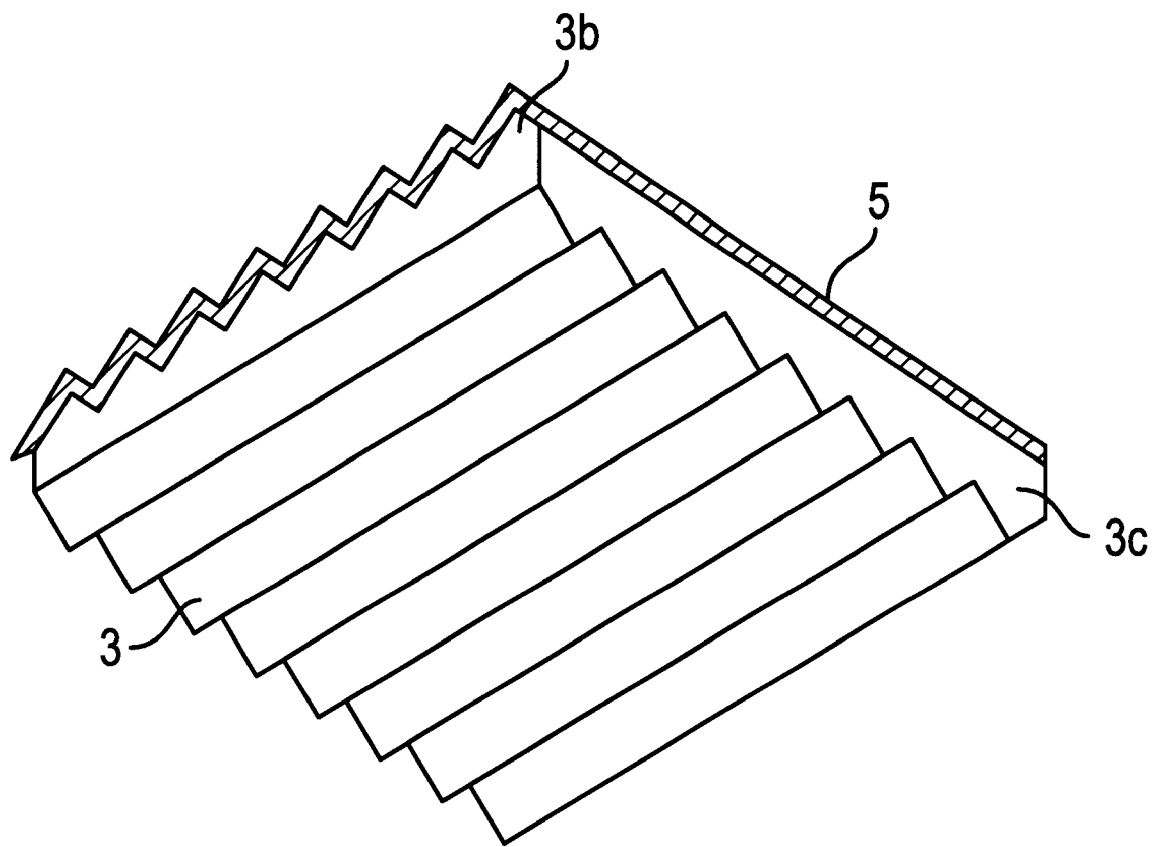
FIG. 3 is a perspective view showing an example of a light regulation element provided with protrusions on both surfaces thereof.

Also in a case of FIG. 3, when the element is used for the surface light source device, the light diffusion layer 5 is coated on the surface of the protrusions 3b arranged in a manner to face in a direction opposite to the emission surface 1a of the light guide, so that the light having penetrated the light regulation element 3 is diffused by the light diffusion layer 5.

The light regulation element 3 is provided with another group of protrusions 3c which are formed on the other face directed to the emission surface 1a. The latter protrusions 3c run approximately at the right angle with respect to the former protrusions 3b so that output light after passing the light regulation element 3 is diffused differently depending on a longitudinal direction and a lateral direction.

Figure 6:
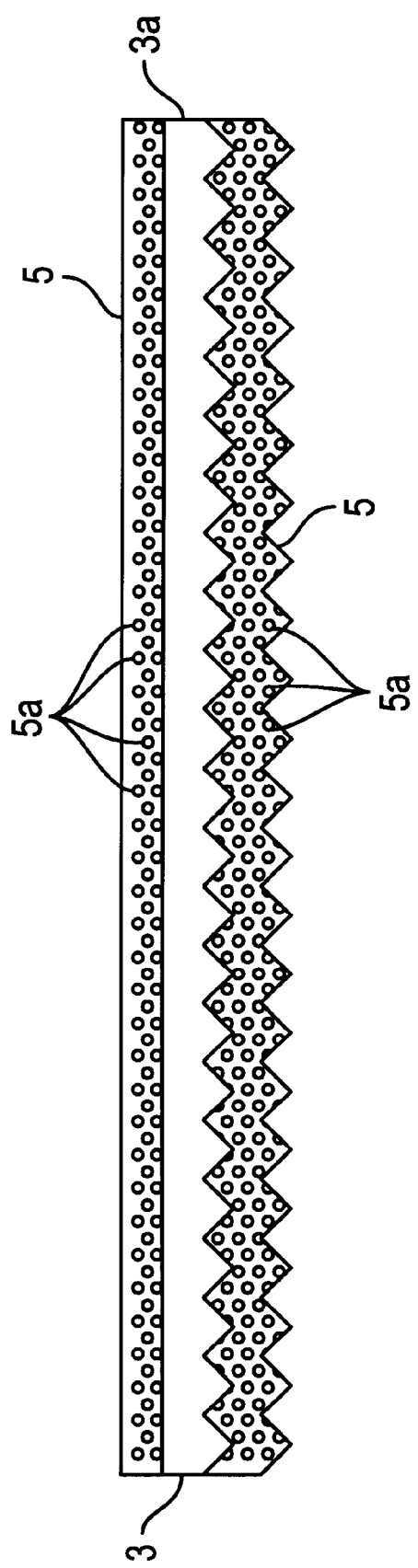
FIG. 6 illustrates a light regulation element with a light diffusion layer coated on both sides thereof.

Although in the above-mentioned embodiment, only an example in which the light diffusion layer 5 is coated on one side of the light regulation element 3, depending on applications, the light diffusion layer 5 may be coated on both sides of the light regulation element 3, as shown in FIG. 6.

In the manner described above, by the coating of a light diffusion layer on a light regulation element used usually, the light regulation element of the present invention can by itself convert the light emitted from a surface light source device to a diffused light while regulating the light travelling direction. The turbidity of the light diffusion layer is set at a range from 1900 $cm^{-1}$ to 2400 $cm^{-1}$, whereby the light can be converted to a diffused light which can satisfy a view angle required for a liquid crystal display.

Also there can be eliminated a loss due to light reflection developed by a fact that a gap can occur between the light regulation element and the light diffusion element. Where the light regulation element of the present invention is applied to an ordinary surface light source device, the decrease in light loss is about 5 to 10% compared with prior art.

Further, the light regulation element of the present invention is integrally formed, so that the gap having existed conventionally between light regulation element and the light diffusion element is removed, thereby not causing a problem such as a foreign matter being caught in the manufacturing process. In addition, the number of optical parts is reduced, whereby the cost of manufacture and quality control is significantly lowered.

Although in the embodiments shown in FIGS. 1, 2 and 3, the protrusions provided on the light regulation element is triangular shape in section, the surface shape for the light regulation of the light regulation element of the present invention is not to be limited thereto. For example, the shape of the protrusions may be set at a spherical or corrugated shape to allow a lens-like action to be performed, whereby the light regulation element be used to change the light travelling direction. Also, a trapezoidal or multi-pyramid shape may be employed, whereby the light regulation element be used to change irregularly the light travelling direction. Generally, the concave or convex shape of the surface for the light regulation of a light regulation element is optionally set.

What is claimed is:

1. A light regulation device, comprising:

a light regulation element having a plurality of protrusions to bend, through refraction, a direction of light penetrating said light regulation element from a light receiving side to a light emitting side, opposite of the light receiving side; and a light diffusion layer formed directly on said light regulation element without an air gap between the light diffusion layer and the light regulation element, wherein said protrusions extend in a first direction on said light receiving side and in a second direction on said light emitting side, said first direction being substantially perpendicular to said second direction so as to perform both lateral light bending and longitudinal light bending.

2. A light regulation device, comprising:

a light regulation element having a plurality of protrusions to bend, through refraction, a direction of light penetrating said light regulation element from a light receiving side to an emitting side, opposite of the light receiving side; and a light diffusion layer formed directly on said light regulation element without an air gap between the light diffusion layer and the light regulation element, wherein each of said protrusions has a depth, the depths of the protrusions being greater toward peripheral portions of the light regulation element than at a central portion of the light regulation element.

* * * * *

UNITED STATES PATENT AND TRADEMARK OFFICE
CERTIFICATE OF CORRECTION

PATENT NO.    : 6,275,338 B1
DATED         : August 14, 2001
INVENTOR(S)   : Takayuki Arai et al.

It is certified that error appears in the above-identified patent and that said Letters Patent is hereby corrected as shown below:

Column 2,
Line 47, delete "element" and insert -- device --.

Signed and Sealed this

Twenty-fifth Day of June, 2002

Attest:

Attesting Officer

JAMES E. ROGAN
Director of the United States Patent and Trademark Office